(12) United States Patent
Jokinen et al.

(10) Patent No.: US 7,355,590 B2
(45) Date of Patent: Apr. 8, 2008

(54) KEYMAT

(75) Inventors: Tapani Jokinen, Oak Park, CA (US);
Michael McKay, Calabasas, CA (US);
Nikolaj H. Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/135,956

(22) Filed: Apr. 30, 2002

(65) Prior Publication Data
US 2003/0201983 A1 Oct. 30, 2003

(51) Int. Cl.
*G09G 5/00* (2006.01)

(52) U.S. Cl. ...................... 345/169; 345/168

(58) Field of Classification Search .............. 345/168, 345/169, 160, 161; 84/719, 720; 400/490, 400/491, 491.1, 491.2, 495; 455/90.3, 128, 455/186.2, 347, 575.1, 575.8
See application file for complete search history.

(56) References Cited

U.S. PATENT DOCUMENTS 3,659,868 A 5/1972 Tucker
4,536,625 A * 8/1985 Bebie .................... 200/5 A
5,214,569 A * 5/1993 Hsiang .................. 361/748
5,367,133 A * 11/1994 Schmidt et al. ........ 200/5 A
2002/0000976 A1* 1/2002 Salminen et al. ........ 345/169

FOREIGN PATENT DOCUMENTS

EP 0 862 308 A 9/1998
GB 2 077 498 A 12/1981
GB 2 239 629 A 7/1991

OTHER PUBLICATIONS

Supplementary European Search Report, EP 03 73 1063, dated Jun. 29, 2007.

* cited by examiner

*Primary Examiner*—Jimmy H Nguyen
(74) *Attorney, Agent, or Firm*—Alston & Bird LLP

(57) ABSTRACT

A keymat for use with a mobile station. The keymat includes a web for interconnecting a plurality of keys, the web and the keys lying external to the mobile-station enclosure when the mobile station is fully assembled. Means for retaining the keymat provide for it to be held in place during normal operation but permitting it to be removed so that user may exchange it for another. A plurality of key pins extending from the keys through openings in the mobile-station external housing may, but are not necessarily exchangeable with the keymat.

18 Claims, 13 Drawing Sheets

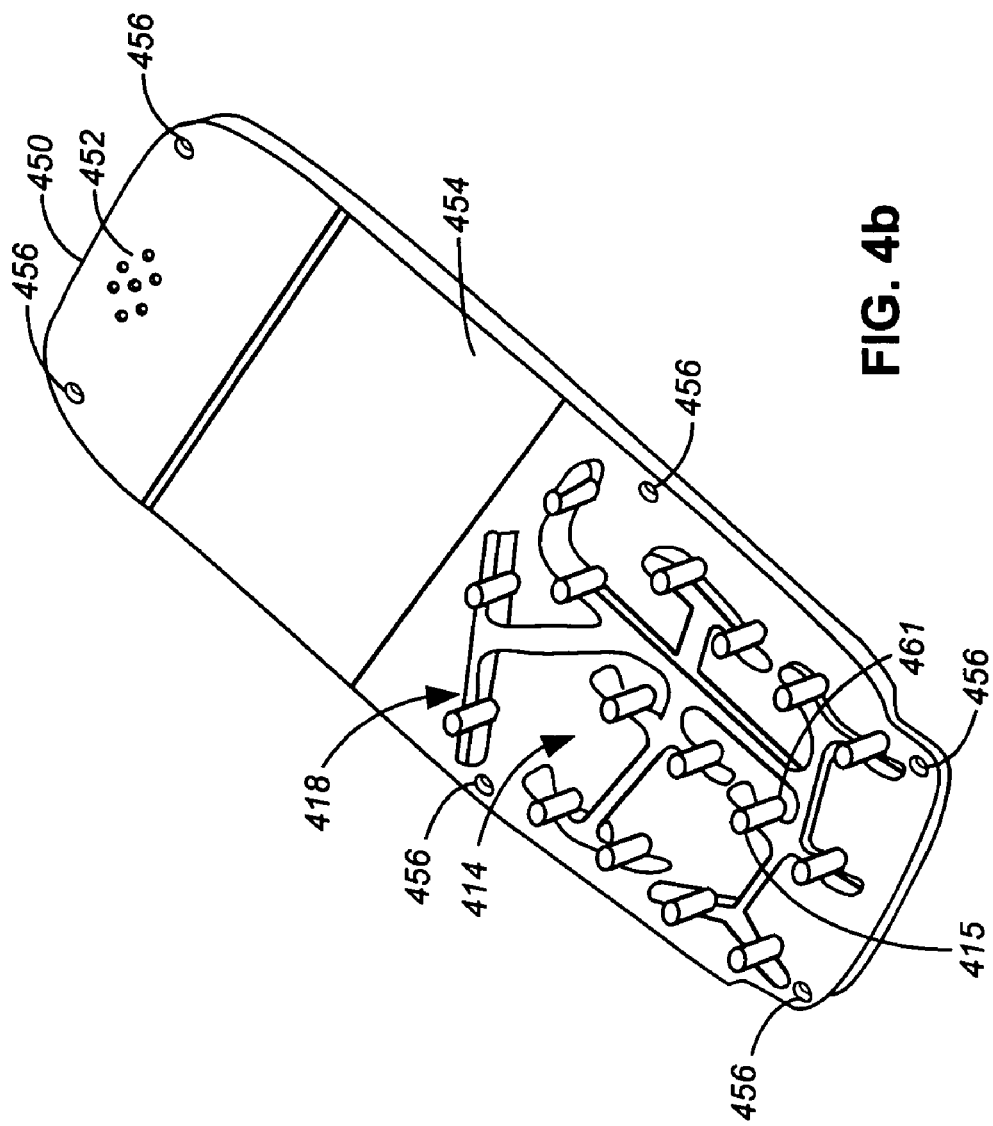
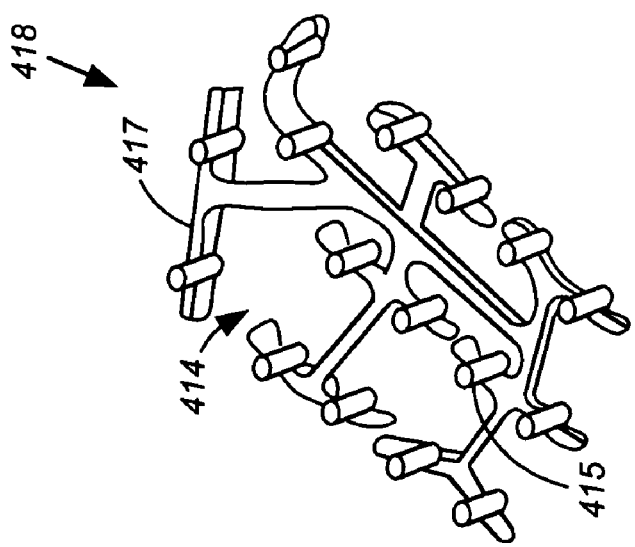
FIG. 4b
FIG. 4a

KEYMAT

The present invention relates generally to the field of mobile station construction, and more specifically to a novel configuration for user-exchangeable keymats for use with mobile telephones and similar devices.

BACKGROUND OF THE INVENTION

Mobile telephones are ubiquitous in modern societies. Once owned and carried only by the affluent or persons in specialized occupations that both required and supplied them, mobile phones are now owned by the many, and sometimes even by the majority of a given population. And no longer are mobile telephones used by only a small segment of the population, but rather now by people of all ages and walks of life.

There are several reasons for this widespread use of mobile phones. The first and foremost, of course, is technology. The development of a cellular system of organizing radio traffic has made possible the subscribing of thousands of customers in a single metropolitan area. Improved multiplexing and modulation techniques have contributed to the ability to handle vast numbers of customers. Coverage has improved as well; that is, the amount of geographic area in which a mobile-system subscriber is within range of a network antenna. At the same time, the cost of the mobile telephone itself and of a subscription to a mobile communications network have fallen and made mobile phone use affordable. Improved technology has also led to the development of ever-smaller and easier-to-use phones. As such improvements in technology often do, rising mobile-phone popularity led to increasingly large markets, which in turn encouraged further innovation.

When, as in the past, mobile phones were used by only a limited set of users (often referred to as subscribers), designs were austere and functional. As long as the instrument performed its given task, appearance was an unimportant consideration. The first mobile phones were large and bulky, and often kept out of sight unless being used. Such use was often kept to a minimum because wireless calls were expensive. Even where possession of the device served as a sort of status symbol, merely having it was sufficient to convey the presumed air of importance.

As the number of mobile subscribers grew, however, and the cost of air time declined, mobile phones became more visible. It is presently as unusual to venture into public and not see someone using a mobile phone as it was in the past to observe someone's cell-phone call. Not unexpectedly, the demand for aesthetically attractive telephones grew with more common usage. Of course, vastly increased mobile phone sales allowed manufacturers to diversify, where previously the cost of implementing more than one or two basic designs would be unreasonable. Demand for new and varied designs also stems from the fact that many mobile phone owners are young adults and adolescents with different tastes than professional business people.

At the same time, the utility of wireless communications devices has increased. Beyond making and receiving calls, mobile phones and similar devices now have the capability to store a phone directly and log calls. Many also include clocks, calendars, and calculators. Others may be used as electronic organizers, or to play games, or even to download Web pages over a wireless connection to an Internet Service Provider (ISP). In this they emulate modern personal digital assistants (PDAs), which started as simple organizers and have themselves grown in functionality. In fact, there is now great variety among the different types of portable devices that are capable of wireless communication. In light of this variety, the term "mobile station" will for convenience be used herein to refer generally to these and similar devices (whether they perform wireless communications or just some of the other functions).

One feature all of these devices must include, however, is one or more forms of user interface. Most include a visual display screen, usually a liquid-crystal display (LCD). Those used for communicating (or recording) will have a microphone and speaker, or at least a port through which a separate microphone and speaker may be connected. Finally, all, or almost all mobile stations include a keypad. The keypad is a set of external, user-accessible push-buttons or similar mechanisms used to enter information or make the device perform certain functions. There are many different designs for keypads and different buttons that may be included in them. Each button may have more than one function. In a typical device, however, there will be a set of buttons associated with alphanumeric (and a few other) characters. Specialized buttons may be used for scrolling (moving images up and down or sideways in the display), to initiate or terminate a call, or some function that varies with application state. The keyboard buttons are usually not switches themselves, but rather correspond with, and thus operate internally located switches. They are frequently made of an insulating material because the voltages used by mobile stations are so small that there must be no opportunity for a user to contact any electrical components. For manufacturing convenience, all or some of the buttons may be integrally formed along a sheet of (typically) non-conducting material, with individual buttons identified by a raised surface, visible markings, or both. This sheet of buttons is commonly referred to as a keymat.

The keymat is typically made of an elastomeric material so that it is non-conducting, flexible, and resilient. Any given device may have one or more keymats, with each keymat usually, though not necessarily, forming a plurality of keys. Each keymat is captured inside of an exterior housing portion and itself is inaccessible to the user. The exterior housing portion, however, forms one or more openings corresponding to each button, or key, on the keymat, allowing the raised portions of the keymat to protrude toward the device's exterior. The keymat is also supported from the interior side in such a way that the user can, by pressing or otherwise manipulating a key, cause activation of only the desired switch or switches, and so that when the key is released, it and its associated switch return to their resting state. For more detail regarding conventional construction, refer to FIG. 1 and the related descriptive text below.

Enclosed in this typical fashion, however, the keymat contributes only a little to the device's overall appearance. It's functional configuration is well-suited to operating the mobile station, but even if more artistically designed, it does little to impact the 'look' of the instrument. It is certainly not easily exchangeable, generally being replaced only by a service technician, and then only when necessary. It cannot ordinarily be used to customize the mobile station's appearance to any significant degree.

Needed is a mobile-station keypad having a keymat that can be conveniently removed and installed so that the user may easily exchange keymats for aesthetic or functional reasons, but at the same time does not detract significantly from the mobile station's normal operation or integrity. The keymat design of the present invention provides just such a solution.

SUMMARY OF THE INVENTION

The present invention is a keymat for a mobile station or similar device that can be easily removed and reinstalled, allowing a mobile station user to exchange the keymat for another, permitting customization for appearance or functionality. In one aspect, the invention is a keymat that is installed on the exterior surface of the mobile station, that is, having retaining means to removably retain the keymat such that it remains in place for mobile-station operation. The retaining means may include a plurality of key pins integrally-formed with the keymat and extending inwardly through openings formed in the front cover of the mobile station, extensions formed in at least one of the plurality of key pins having an extension that removably engages the interior surface of the front cover. In another embodiment the retaining means includes a plurality of key pins retained substantially inward of the front cover, and the keymat includes a plurality of recesses for receiving the key pins so disposed. In yet another embodiment the keymat is fixedly attached to a plurality of key pins that form a recess for being engaged by a slide plate disposed inward of the front cover.

In another aspect, the present invention is a mobile station having internal switches that can be activated by a force applied to a corresponding key on a key pad, the key pad including a removably attached external keymat web, the web being held in place during operation by retaining means, and the key pad also including a plurality of key pins corresponding to the internal switches and extending through openings formed in the front cover of the mobile station. Such that a force applied to the keymat web is transmitted to the switch through a pin.

BRIEF DESCRIPTION OF THE DRAWINGS

FIG. 3a is an isometric view illustrating the interior side of the keymat itself; FIG. 3b is an isometric view of the keymat assembled on the face of the front cover of an exemplary mobile station; and FIG. 3c is a partial sectional view illustrating the cooperation of an exemplary keymat key with other mobile-station components.

FIGS. 4a-4f illustrate a keymat used according to another embodiment of the present invention; FIG. 4a is an isometric view of a key-pin grid; FIG. 4b is an isometric view illustrating the key-pin grid of FIG. 4a as assembled adjacent a light guide; FIG. 4c is an isometric view illustrating an exemplary mobile-station front cover overlaying the assembly of FIG. 4b; FIG. 4d is an isometric view illustrating the interior side of a keymat for use in accordance with this embodiment of the present invention; FIG. 4e is an isometric view illustrating the keymat mounted on the assembly shown in FIG. 4c; and FIG. 4f is a partial sectional view illustrating the cooperation of an exemplary key with other mobile-station components.

FIG. 5a is an isometric view of a slide plate; FIG. 5b is an isometric view of the slide plate of FIG. 5a assembled onto a mobile-station light guide; FIG. 5c is an isometric view of a keymat according to this embodiment of the present invention; FIG. 5d is an isometric view of the keymat of FIG. 5c assembled onto a mobile-station front cover; and FIG. 5e is a partial sectional view illustrating the cooperation of an exemplary key with other mobile-station components.

FIG. 6a is an isometric view of a specialized keymat; FIG. 6b is an isometric view of the keymat of FIG. 6a assembled onto a mobile-station front cover; and FIG. 6c is a partial sectional view illustrating the cooperation of the joystick with other mobile-station components.

DETAILED DESCRIPTION

The preferred embodiment of the present invention is a keymat for use with a mobile station, such as a cellular telephone. As mentioned above, the term "mobile station" will, for convenience, refer generally to cellular telephones and other portable electronic devices such as personal digital assistants (PDAs), Web-enabled telephones, palm top computers, and the like.

Figure 1:
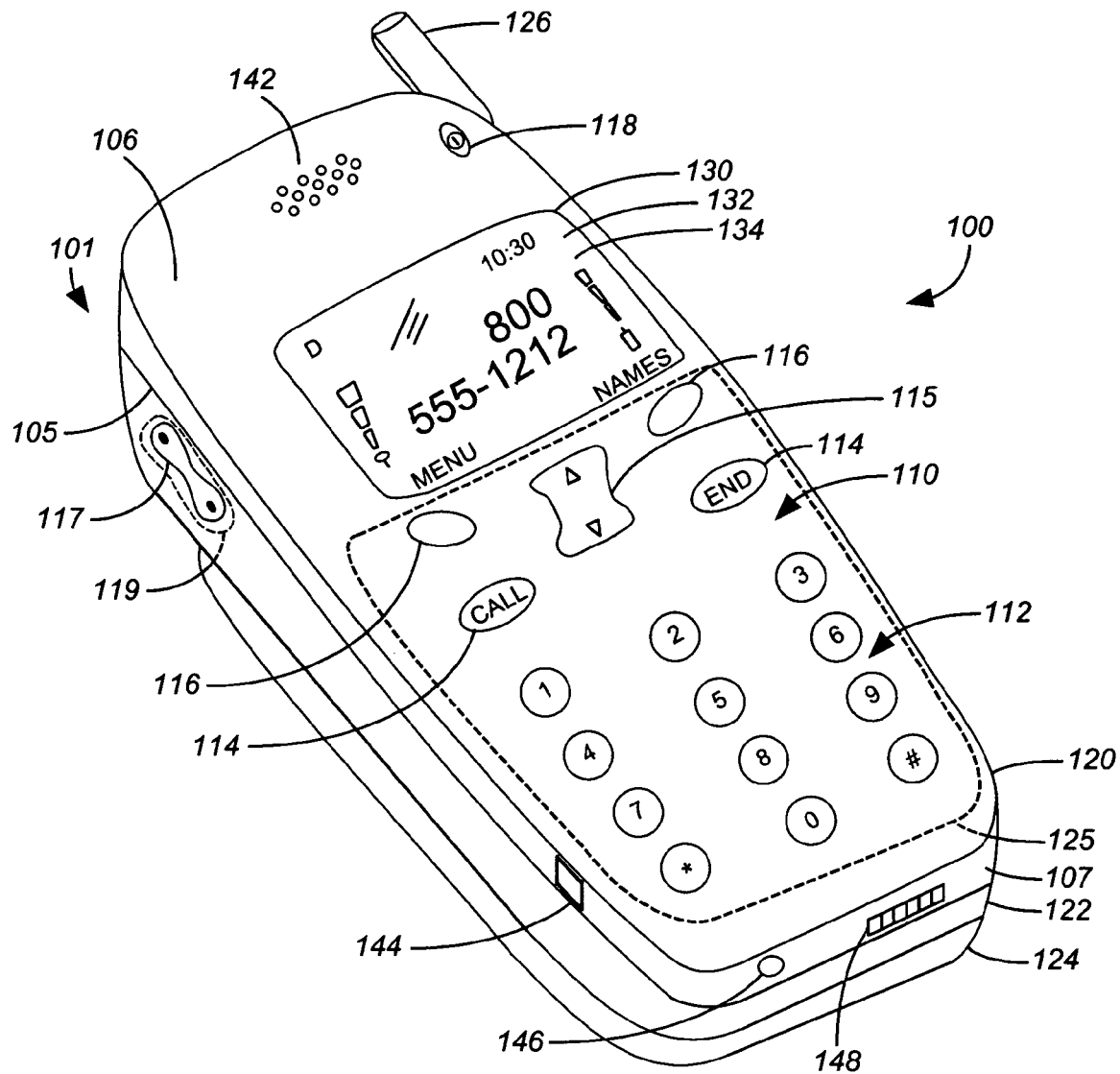
FIG. 1 is an isometric view of a typical mobile station, here a cellular telephone, according to the prior art.

FIG. 1 is an exterior isometric view of a conventional mobile station, in this case a mobile phone 100, according to the prior art. Mobile phone 100 is a radio telecommunication device for use in a cellular communication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed. Mobile station 100 is most often used for real-time voice communication, but can be used for short-message-system (SMS) messaging, data transmission, Web surfing, game-playing, and paging services as well.

The internal circuitry and components (not shown in FIG. 1) of mobile phone 100 are contained in a casing, or enclosure, that typically includes two or more sections, and which will sometimes herein be referred to as covers. Referring to FIG. 1, mobile phone 100 has an enclosure 101 that includes front cover 120 and back cover 122, which are removably fastened together at joint 105 when the phone is assembled. Front cover 120 and back cover 122 are not normally taken apart except for maintenance, and then usually only by a service technician. Front cover 120 and back cover 122 are normally made of a hard plastic material, such as polycarbonate/ABS (PC/ABS). This material is strong enough to protect the telephone internals from reasonable shock encountered in ordinary operation and to resist penetration by objects that it may encounter when placed in a user's pocket, purse, or briefcase.

Several openings are formed in enclosure 101 of mobile phone 100, with most, though not necessarily all of them present in front cover 120. The keypad 110 on face 106 of front cover 120 is a user interface including a plurality of openings, through which protrude keys such as alphanumeric keys 112, call control keys 114, scroll key 115, and function keys 116. As their names imply, these keys perform various duties in the phone's operation, with the alphanumeric keys 112 having a standard telephone keypad role, and with the function and scroll keys used in connection with display 134. That is, the function of the function and scroll keys are variable and determined by the application state that the mobile phone is in, which is typically translated into a word or icon displayed on display 134 next to the appropriate key. In the illustrated device, alphanumeric keys 112 are part of an integrated keymat 125, as are call control keys 114, scroll key 115, and function keys 116. Keymat 125, generally speaking, is a sheet of flexible material predominately disposed inside of enclosure 101 (as delineated by the broken line) except for the protruding keys. It is convenient but not necessary that all of the keys of keypad 110 are formed on the same keymat. They could instead be found on two or several. A keymat may also be associated with a single key. Keymat 119 includes volume control 117. (Note that scroll key 115 and volume control 117 actually each include two "keys", a distinction immaterial to the definition of "keymat".)

Display 134 is typically a liquid crystal display (LCD) device. The LCD itself is protected by a plastic window pane 132, which is mounted to cover the display and protrude into window 130, an opening formed in front cover 120. As illustrated in FIG. 1, display 134 presents to the user such information as current function-key functions, telephone numbers, signal strength, and other information useful to the operation being performed. The protective window pane 132 is typically a component separate from the LCD, its chassis, and other portions of the internal assembly (not shown in FIG. 1). Window pane 132 is necessary because the components making up the LCD are typically fragile and subject to damage from even mild strikes.

Also formed in face 106 of front cover 120 is a small opening for power switch 118 and a plurality of small openings 142 that serve as a port for the speaker (not shown), which is mounted beneath them. At the opposite end of mobile station 100, microphone port 144 likewise permits entry of sound directed at the actual microphone (not shown) mounted inside. In the embodiment of FIG. 1, microphone port 144 is formed in the side of front cover 120, but could be formed anywhere proximate to the expected voice source, for example among alphanumeric keys 112 or on the bottom end 107 of front cover 120.

Formed in the bottom end 107 of front cover 120 are power port 146 for plugging in an external power adaptor and headphone port 148 for connecting an external headset and perhaps a microphone for hands-free operation. Power port 146 and headphone port 148 are receptacles for connecting (plugging in) an external appliance to the internal circuitry of mobile station 100. These receptacles are mounted within the mobile station's internal assembly (not shown) and are accessible from the outside through openings formed in end 107 of front cover 120. Note in this context that as used herein, the term "port" may refer to either a mere opening in the cover or an electrical connection mounted in an opening, with the distinction between these two types of port made only when necessary.

Back cover 122 frequently forms a recess (not shown) for receiving battery 124, to which it is removably attached during operation. In alternate versions, the battery may be received into an internal battery compartment and enclosed by the back cover or inserted into an opening in the back cover and protected or held in place by a separate battery cover. Also shown on back cover 122 is volume control 117, which, like the other keys, is accomplished by a key member protruding through an opening formed in the cover, in this case, back cover 122, that when manipulated by the user activates a switch located on the inner telephone assembly (not shown). Finally, radio transmission by the mobile station 100 shown in FIG. 1 is accomplished through use of antenna 126.

Figure 2:
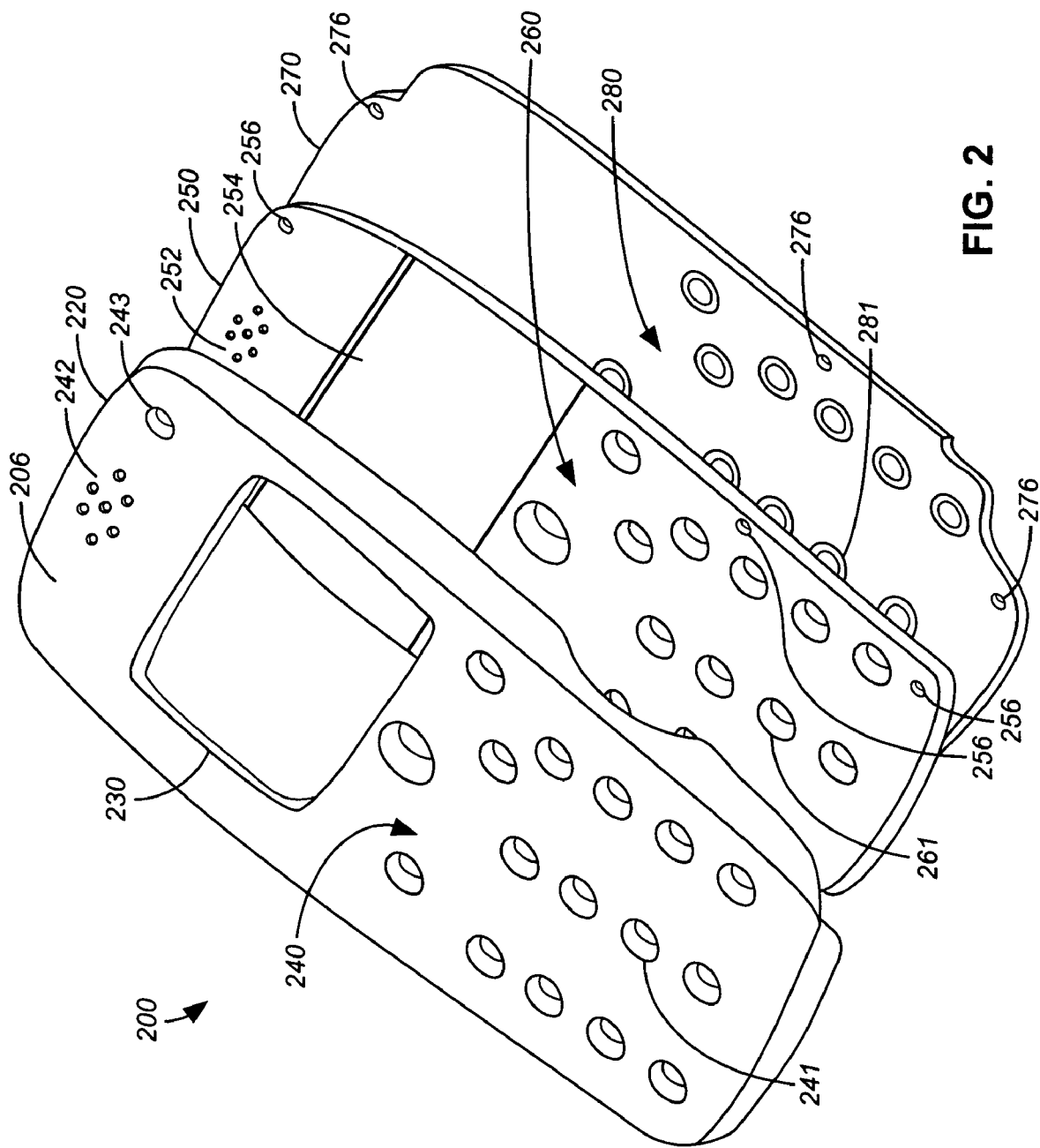
FIG. 2 is a simplified exploded view illustrating selected components of a mobile station that may be used with a keymat constructed according to the present invention.

FIG. 2 is a simplified, exploded view illustrating selected components of a mobile station 200, which is similar though not necessarily identical to the mobile phone 100 of FIG. 1, mobile station 200 being configured for use with the keymat of the present invention. Various embodiments of this novel keymat configuration are set forth in FIGS. 3a through 6c. The selected components are, namely, front cover 220, light guide 250, and printed wire board (PWB) 270 (sometimes referred to as a printed circuit board). Major components not shown in FIG. 2 include the back of the mobile station, the battery, and the LCD. Also not shown are details of the illustrated components that are not necessary in explaining the construction and operation of the present invention.

Certain features are, however, included for reference. Front cover 220 forms display window 230 through which an LCD would ordinarily be visible, and a collection of small openings make up speaker part 242. Opening 243 permits access to a power switch (not shown). The main exterior wall of front cover 220 will be referred to as the face 206 of mobile station 200.

Light guide 250 is a component made of transparent or translucent material (or a combination of the two) having the function of spreading or diffusing light from an internal light source or sources (not shown), which are typically light-emitting diodes (LEDs). This distribution of light from discrete sources helps to provide even illumination for certain components visible to the user. One such component may be the LCD (not shown in FIG. 2), which, in the assembled mobile station 200, is disposed in recess 254 of light guide 250. Light guide 250 may also serve as an interior cover for the mobile station's internal components. If so, together with a chassis (not shown), light guide 250 captures and encloses PWB 270 and its mounted electrical components. Threaded fasteners extending through fastener openings 256 in light guide 250 and fastener openings 276 in PWB 270 secure the components of this internal assembly together. Note, however, that the presence of light guide 250 is preferred, but not required.

Note also that as used herein, the term "interior" as applied to the mobile station 200 means inside of or in a direction toward PWB 270, and "exterior" means outside of or toward the outside. The "front" of mobile station 200 is the side on which the display is visible to a user. Face 206 (shown in FIG. 2) forms the front exterior surface of mobile station 200. Speaker part 242 is formed near the "top" end of face 206.

Returning to FIG. 2, PWB 270 typically forms a mounting surface (actually two; both front and back are used) for most of the components, conductors, and circuitry of mobile station 200. For clarity these are not shown, except for key domes 280. A key dome such as key dome 281, which has been enumerated to serve as an example, is a structure disposed above two (or more) switch elements (not shown). When pressed toward the PWB 270, it deforms and contacts the switch elements to complete a circuit. Typically, when the pressure on the key dome is released, key dome 281 returns to its original undeformed condition and the circuit is opened. The pressure on the key dome 281 originates when the user presses the key (not shown) protruding through exemplary opening 241 formed in front cover 220. To reach key dome 281, the key-pressing force is translated interiorly through the key (not shown), which also extends through exemplary opening 261 in light guide 250. As with exemplary key dome 281, key opening 241 and opening 261 are simply examples of the plurality of key openings 240 formed in front cover 220 and the plurality of key openings 260 formed in light guide 250, respectively. The other key openings and key domes are similar or identical to their respective enumerated examples. The keys themselves, which are not shown in FIG. 2, will now be described in more detail. In the description that follows, similar reference numbers are used where possible to enumerate similar components. The same numbers are generally not repeated, however, to avoid confusion where variation in design is possible or required. Although comparing the different embodiments described below will aid in understanding the invention, similarity in reference numbers should not be interpreted to contradict any variation clearly expressed in the description and drawings.

Figure 3A:
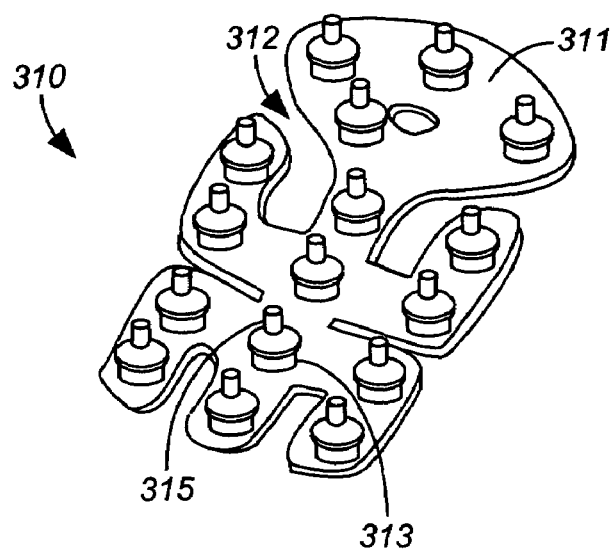
FIGS. 3a-3c illustrate a keymat according to one embodiment of the present invention.
Figure 3B:
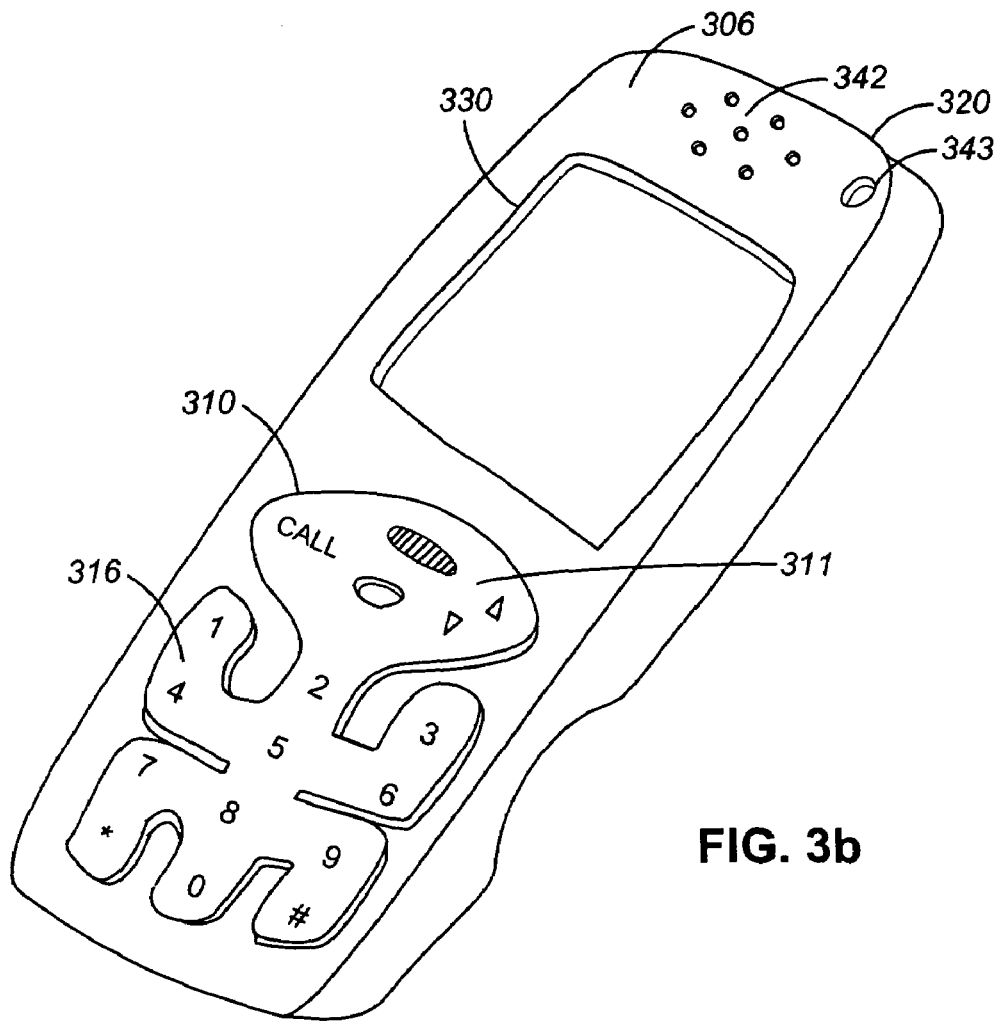
Figure 3C:
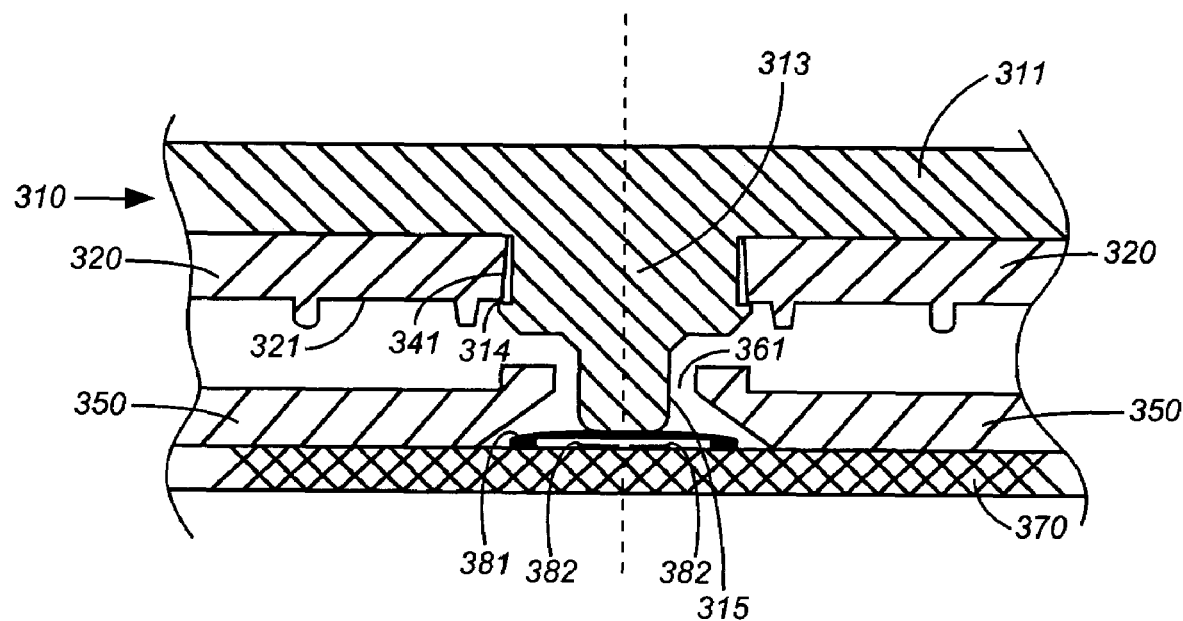

FIGS. 3a-3c illustrate a keymat 310 according to one embodiment of the present invention; FIG. 3a is an isometric view illustrating the interior side of the keymat 310 itself; FIG. 3b is an isometric view of the keymat 310 assembled on the face 306 of front cover 320 of an exemplary mobile station; and FIG. 3c is a partial sectional view illustrating the cooperation of an exemplary key 313 and other mobile-station components. Referring first to FIG. 3a, external keymat 310 includes a plurality of keys 312, each key, such as exemplary key 313 having a key pin 315. Key pin 315, in an assembled configuration, extends interiorly toward key dome 381 (shown in FIG. 3c) and serves to translate to key dome 381 the force applied by a user pressing a key. The various keys 312 are maintained in position relative to each other by web 311. Web 311 serves to retain keys 312 in their proper relation to each other, making installation and removal easier. In addition, it helps to keep the individual keys properly oriented so that they do not work themselves out of place during operation. Web 311 can be designed in a great variety of shapes and colors to personalize or customize the appearance of mobile station 300. One subscriber may in fact accumulate a collection of different keymats to remove and install for different occasions or applications. In the embodiment of FIGS. 3a-3c, the keys, including the key pins, and the web are integrally formed of sturdy yet flexible material. Note, however, that the exact properties of the materials used in construction are not significant (except where explicitly stated or claimed), so long as the member in question substantially performs its function as described in relation to a particular embodiment of the present invention.

Turning now to FIG. 3b, keymat 310 of FIG. 3a is shown (inverted and) assembled in an operational configuration adjacent face 306 of front cover 320. The keys 312 are not visible in this view, having been received into the key openings in the front cover (see, FIG. 2). Although it is not necessary that each key opening receive a key element, it is preferred that those not being so utilized are covered by keymat web 311 or some other means (such as a separate cover, not shown). In this way, foreign materials are prevented from entering through unused openings. The markings or labels shown on the exterior face 316 of keymat 310 are preferred but optional, and if present preferably relate to the specific mobile-station application or applications for which the particular keymat 310 is intended. The labels may be applied in a variety of known ways, including imprinting or adhesive attachment of a printed template. These options are available regardless of whether keymat 310 is produced using a one-shot molding process, as is the case with the embodiment of FIGS. 3a-3c. Other embodiments described below enable further labeling options. And although keymat 310 is shown having a flat configuration and disposed immediately adjacent to front cover 320, these features are not requirements of the invention. Alternate embodiments (not shown) include placing a template or other object between the keymat 310 and front cover 320, perhaps for decorative or labeling purposes; disposing keymat 310 partially or fully into a recess formed in front cover 320; and forming raised areas on the external face 316 of keymat 310, perhaps to indicate the location of a key or for added ornamentation.

In one alternate embodiment (not shown) of the present invention, an article of clothing such as the sleeve of a shirt, the back of a motorcycle jacket, or a vest may be provided with a plurality of appropriately spaced openings such that the inwardly extending portions of keys 312 may be passed through to be mounted on a mobile station placed inside of the clothing. An interior may be provided for receiving the mobile station, or it may simply be held in place by the cloth captured between front cover 320 and keymat 310. In this embodiment, a remote microphone and speaker would be advantageously used, and themselves possible incorporated into an article of clothing themselves. While any of the keymat retention methods described herein would be suited for such an application, the design may altered slightly to accommodate the higher resulting stresses involved and the greater distance between the keymat 311 and the key domes inside the mobile station.

FIG. 3c is a partial sectional view illustrating the cooperation of key 313 and other mobile-station components. Here, external keymat 310 is clearly shown disposed on and, in this case, adjacent to the exterior of front cover 320. Opening 341 in front cover 320 receives key 313 in such a manner that key pin 315 is in operable proximity to key dome 381, a structure disposed above two (or more) internal switch elements 382, on PWB 370. (The actual switch leads and conductors disposed on the surface of PWB are, for simplicity, not shown, though their position relative to key dome 381 and switch elements 382 should be apparent to one skilled in the art.) Light guide 350, disposed adjacent to PWB 370 forms an opening 361 for receiving key 313. Note that the relative size of the key components and openings is exemplary, and some variation in shape may be desirable for a particular application. Key 313, in this embodiment, forms circumferential lip 314 for engaging the interior surface 321 of front cover 320 proximate to opening 341. The key 313, as mentioned above, is preferably made of a resilient material such that it may be forced in and out of the relationship illustrated in FIG. 3c by a sufficient pulling or pushing force, but will otherwise remain in place during normal operation and handling. Note that using either elastomers or hard plastics for both the key elements and the front cover are also feasible embodiments, though not presently preferable.

Figure 4C:
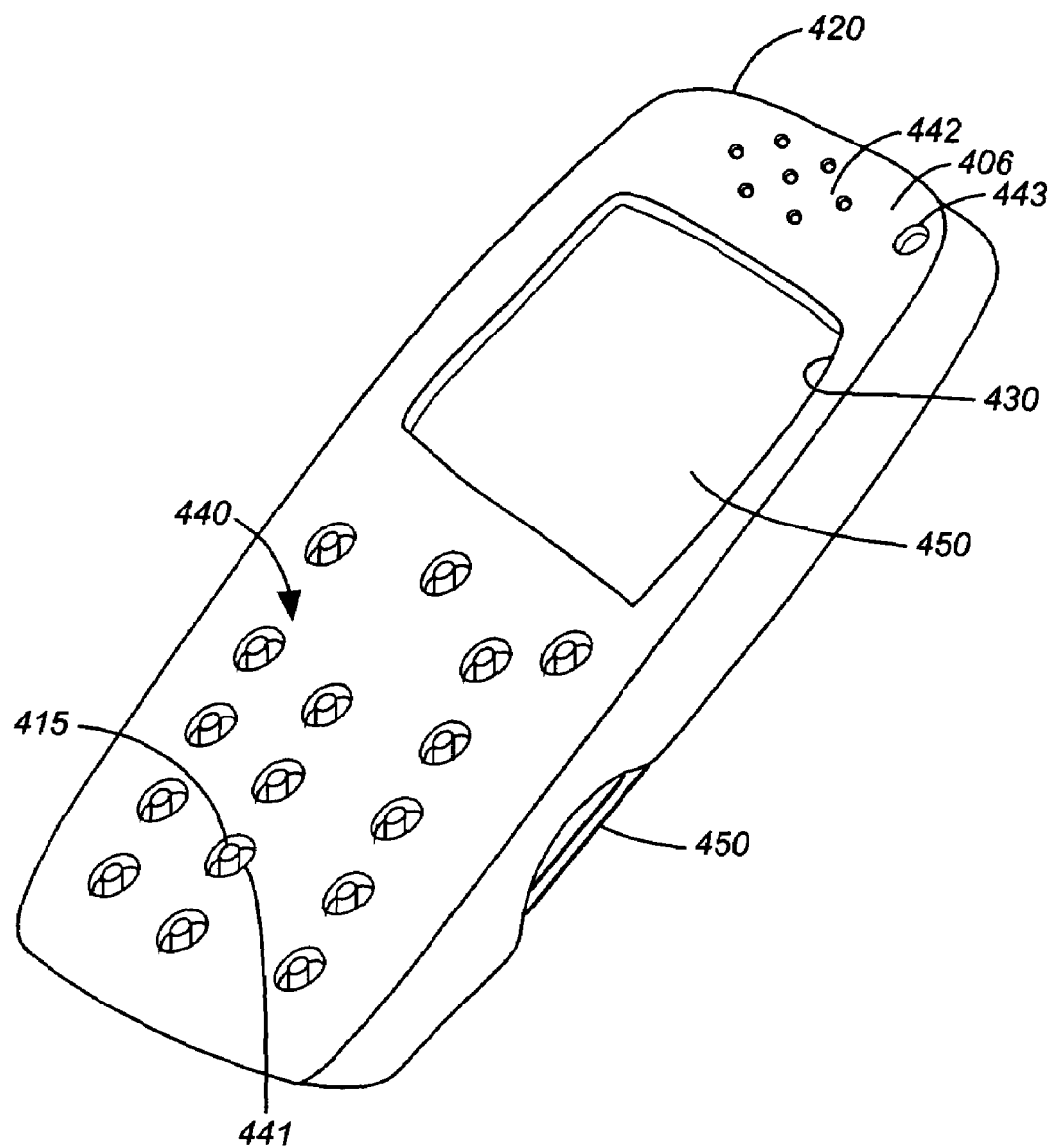
Figure 4D:
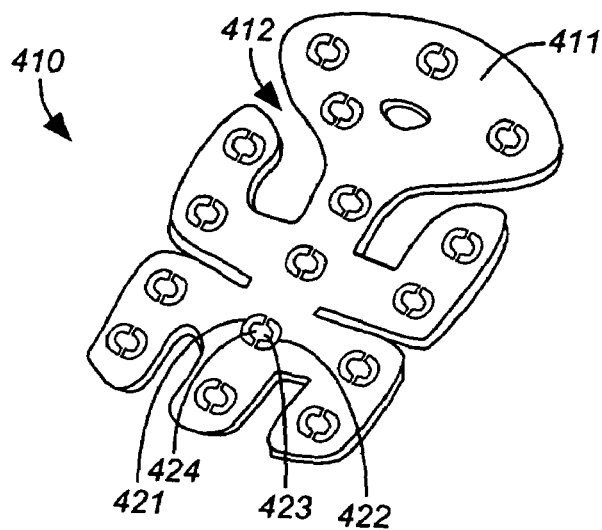
Figure 4E:
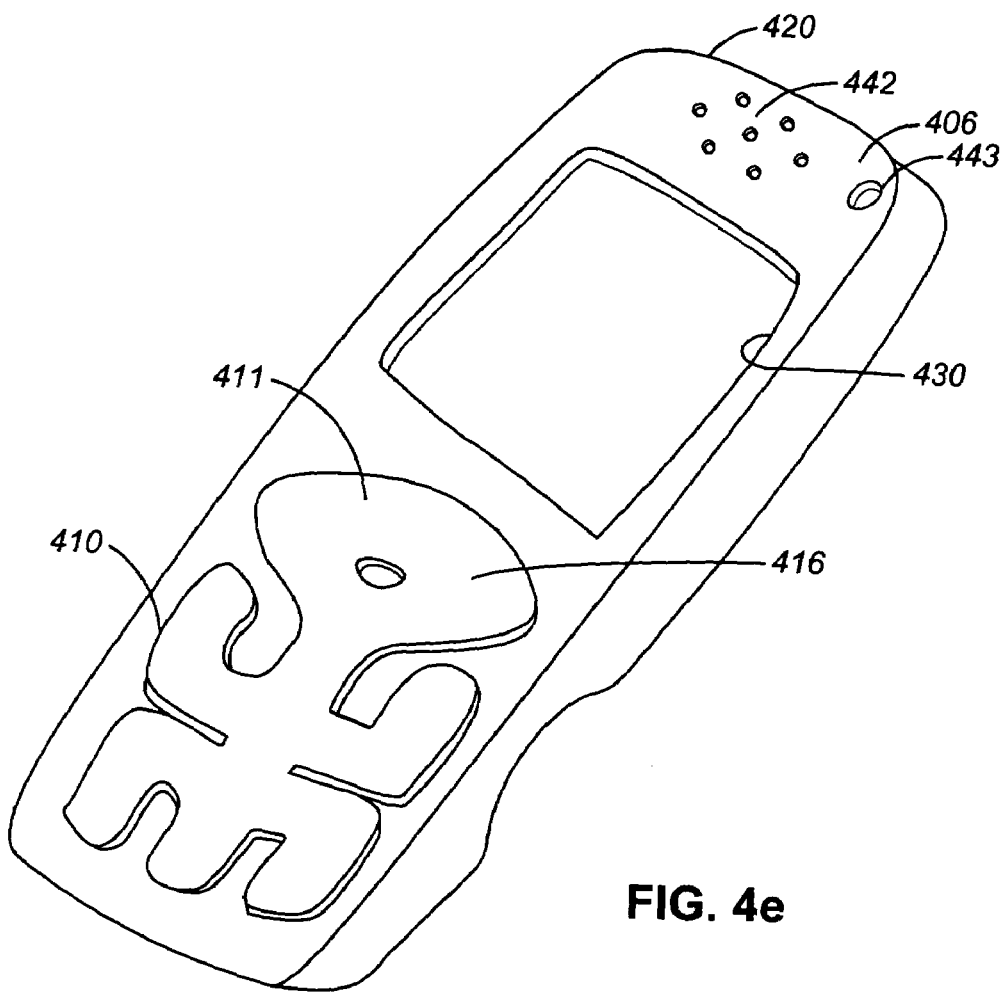
Figure 4F:
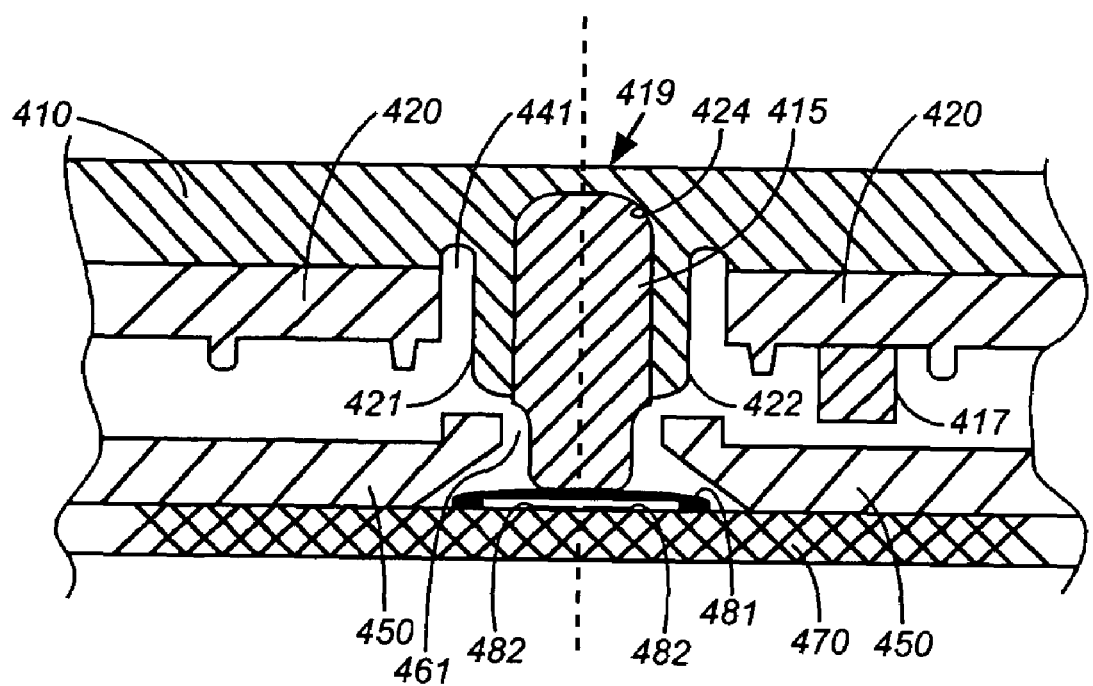

FIGS. 4a-4f illustrate a keymat 410 according to a preferred embodiment of the present invention; FIG. 4a is an isometric view of a key-pin grid 418; FIG. 4b is an isometric view illustrating the key-pin grid 418 of FIG. 4a as assembled adjacent a light guide 450; FIG. 4c is an isometric view illustrating an exemplary mobile-station front cover 420 overlaying the assembly of FIG. 4b; FIG. 4d is an isometric view illustrating the interior side of a keymat 410 for use in accordance with the embodiment of the present invention; FIG. 4e is an isometric view illustrating the keymat 410 mounted on the assembly shown in FIG. 4c; and FIG. 4f is a partial sectional view illustrating the cooperation of an exemplary key 413 and other mobile-station components. Referring first to FIG. 4a, key-pin grid 418 is shown in isolation, where it can be seen that it includes a plurality of key pins 414 held in a substantially fixed relationship by a network of branches 417. Of course, the key grid design shown in FIG. 4a is only one of many. In the illustrated embodiment, the branches 417 are unobtrusive, with minimal light-blocking effect. Other designs may be preferable in other circumstances. Connecting each key pin to more than one branch, for example, would provide greater stability and a redundant connection in case one branch is broken. A solid sheet of transparent plastic foil may also be used to interconnect the key pins 414.

FIG. 4*b* is an isometric view of key-pin grid 418 assembled in its operating configuration adjacent light guide 450. When so installed, each key of key-pin grid 418 is received in an opening formed in light guide 450. Exemplary key pin 415 for example extends through opening 461. Although the pins and openings of FIG. 4*b* correspond exactly in number, this is not necessarily the case. As mentioned previously, however, unused openings should be covered in some way. The key-pin grid 418 may simply lie outside of light guide 450, or the latter may form a recess for receiving the former and thereby restrain its lateral movement and reduce the overall profile of the assembly. In an alternate embodiment (not shown) key-pin grid 418 and light guide 450 may be formed together, with either flexibility of material or slidable attachment of pins 414 permitting key operation.

FIG. 4*c* is an isometric view of front cover 420 mounted on the assembly of FIG. 4*b*. When thus assembled, front cover 420 and light guide 450 capture key-pin grid 418 between them. In this embodiment, the key-pin grid 418 will preferably be left in place through normal operation and removed or replaced only when necessary. (Note that although not shown in FIG. 4*c*, the LCD would normally be present and visible at this stage of assembly.) As may be seen in FIG. 4*c* key pins 414 are now accessible through key openings 440.

FIG. 4*d* is an isometric view of the interior side of keymat 410. In this embodiment, keymat 410 forms a plurality of key elements 412, each key element such as exemplary key element 413 having a first section 421 and second section 422 of split cylinder 423, which forms an opening 424 for receiving the end of a single key pin, such as key pin 415 shown in FIGS. 4*a*-4*c*. Preferably, when the mobile station is assembled, each key pin is received into a corresponding key-element opening. In the embodiment of FIGS. 4*a*-4*f*, the pins 414 and key elements 412 are made of such material and relative size that although they may be forced into and out of cooperation with each other for installing and removing keymat 410, but are held together by a friction force developed between key element and pin during normal handling and operation. In an alternate embodiment (not shown), however, a (split) circumferential lip (see, e.g., FIG. 3*c*) may also be used to help retain an installed keymat. Note that the split-cylinder design shown in FIG. 4*d* is preferred because it permits air to easily enter the opening during removal, but other designs may be suitable as well.

FIG. 4*e* is an isometric view showing keymat 410 assembled exterior to front cover 420. The by-now familiar components such as LCD window 430, speaker port 442, and power-switch opening 443 are again shown for reference. Note that the exterior face 416 of keymat 410 is unmarked, as may be preferred in some applications. FIG. 4*f* is a partial sectional view illustrating the cooperation of an exemplary key 419, including key element 413 and pin 415, and other components of an exemplary mobile station. Here, key pin 415 is shown inserted into key-element opening 424 between split-cylinder first section 421 and second section 422, this assembly forming an operational key 419 extending through opening 441 in front cover 420 and opening 461 in light guide 450, and operably proximate to key dome 481, which is in turn disposed above two (or more) internal switch elements 482 adjacent PWB 470. Note that while key pin 415 is, in this embodiment, connected to or integrally formed with grid 418, the only grid portion visible in FIG. 4*f* is branch 417. Of course, key pin 415 may alternately not be associated with any grid and instead simply inserted into opening 424 of key element 413. This embodiment is not presently preferred, however.

Although key-pin grid 418 may take any configuration, including a single solid sheet, or may include more than one separable components, its installed configuration between front cover and light guide typically mean that mobile station may be used even without keymat 410. This will be true, of course, so long as the exterior ends of key pins are sufficiently accessible to the user when front cover is in place. In one alternate embodiment (not shown) the exterior ends of key pins 414 are formed so that they may be operated with a stylus or the point of a ball-point pen, for example by forming a concave dimple. Some users may actually prefer to use the mobile station in this configuration, though presumably it will be useful to most as assurance that the mobile station will still be operable when the keymat 410 has been mislaid or lost. The fact that the key pins 414 remain in place even when the keymat is removed also helps to prevent deleterious materials from entering the mobile-station interior during keymat exchange.

Figures 5A, 5B:
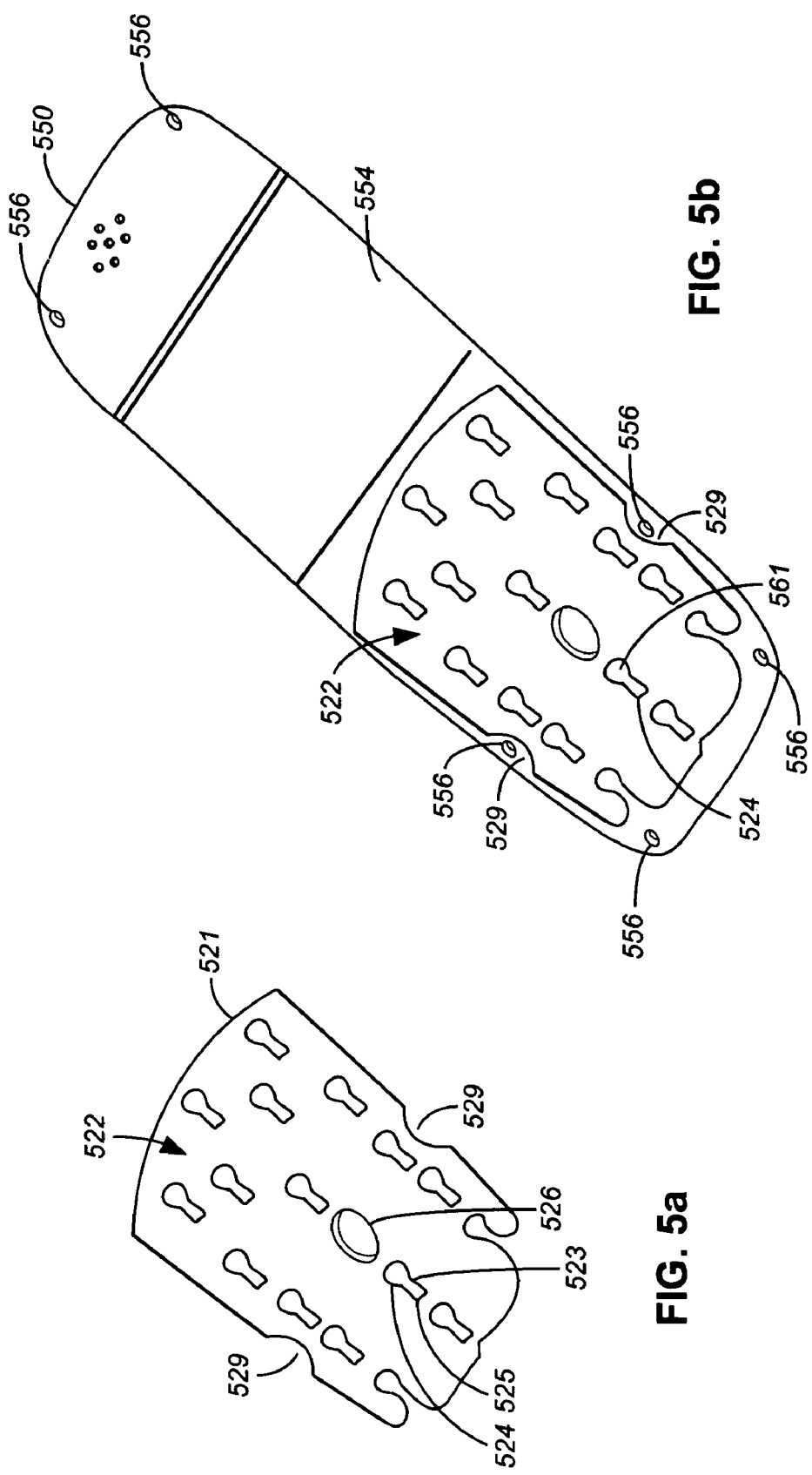
FIGS. 5a-5e illustrate a keymat used according to another embodiment of the present invention.
Figure 5C:
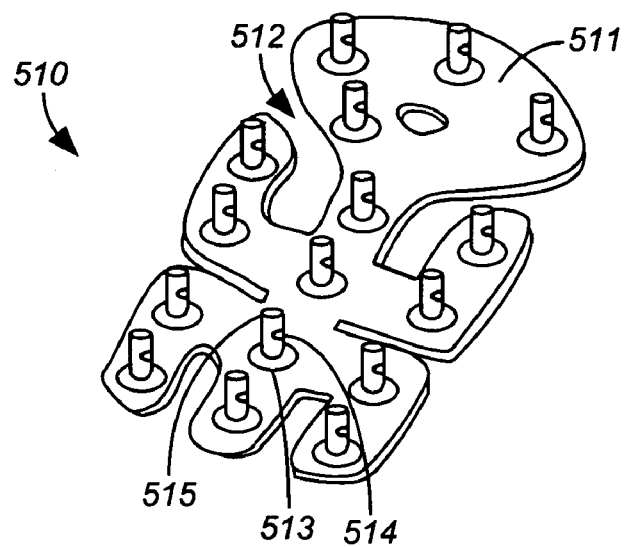
Figure 5D:
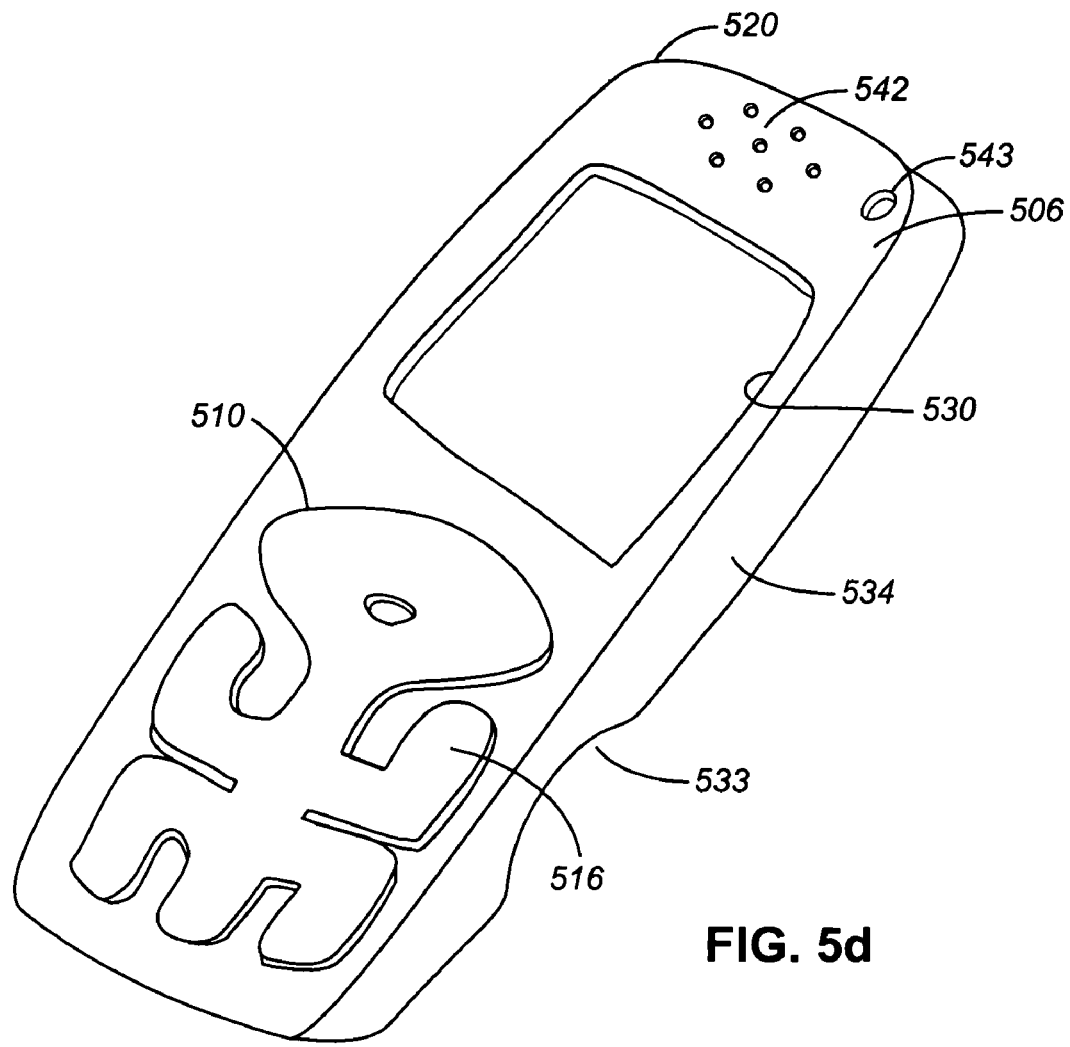
Figure 5E:
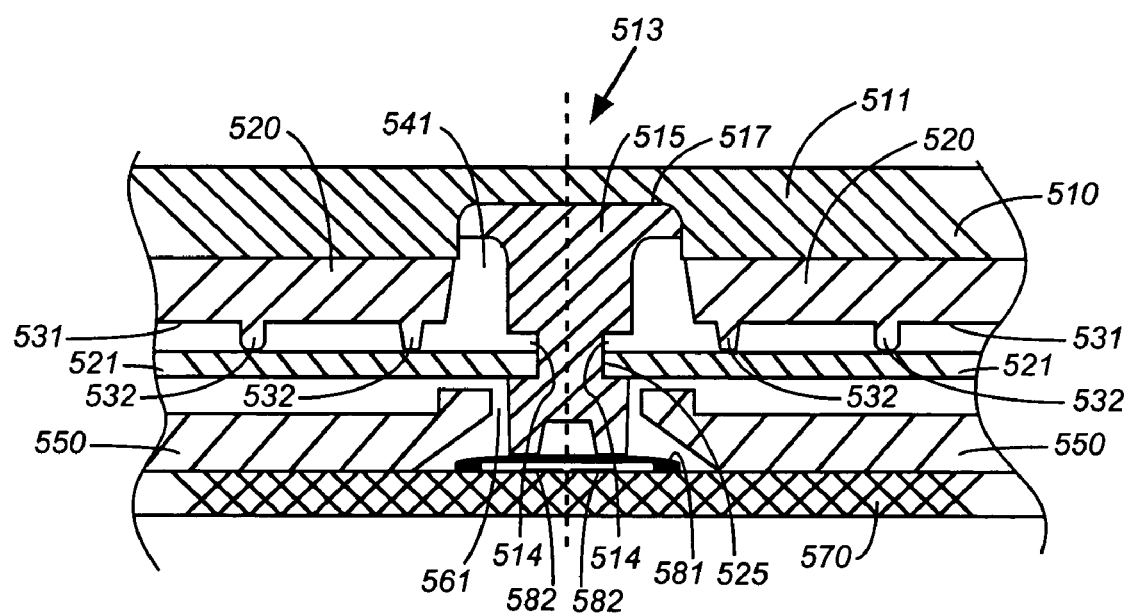

FIGS. 5*a*-5*e* illustrate a keymat 510 used according to another embodiment of the present invention; FIG. 5*a* is an isometric view of a slide plate 521; FIG. 5*b* is an isometric view of the slide plate 521 of FIG. 5*a* assembled onto a mobile-station light guide 550; FIG. 5*c* is an isometric view of a keymat 510 according to this embodiment of the present invention; FIG. 5*d* is an isometric view of the keymat 510 of FIG. 5*c* assembled onto a mobile-station front cover 520; and FIG. 5*e* is a partial sectional view illustrating the cooperation of an exemplary key 513 with other mobile-station components. Turning first to FIG. 5*c*, in this embodiment keymat 510 includes web 511 and a plurality of keys 512. Each key, for example exemplary key 513, includes a key pin. Exemplary key pin 515 of key 513 is generally cylindrical in shape and forms a pair of opposing recesses 514. This pair of recesses 514 cooperate with the slide plate 521 shown in FIG. 5*a* to retain keymat 510 in place. Referring to FIG. 5*a*, slide plate 521 includes a plurality of key openings 522 corresponding to the pins of keymat 510. Naturally, there must be at least as many slide-plate openings 522 as there are keys 512 on keymat 510 (unless unneeded keys are somehow removable), but there could be more. Exemplary key opening 523 includes a larger portion 524 shaped to receive key pin and a smaller portion 525 that will receive only the portion of key pin 515 having its dimension reduced by the pair of recesses 514. In the embodiment of FIGS. 5*a*-5*f*, the key openings in slide plate 521 form a round portion for receiving key pins and a narrower "slotted" portion. In an alternate embodiment (not shown), the slide-plate key openings may also have varying shapes if advantageous in a particular application, for example to ensure a symmetrical-shaped keymat is installed in the proper orientation so that its labeled keys are properly placed to activate the corresponding switch. Some openings, such as opening 526 shown in FIG. 5*a*, have a specialized purpose (see, FIG. 6*a*).

FIG. 5*b* is an isometric view of light guide 550 also showing slide plate 521 in its assembled condition. The openings 522 of slide plate 521 must correspond, of course with the key opening of light guide 550 (not shown in FIG. 5*b*). Slide plate 521 need not be restrained as thus assembled, and in fact must be sufficiently free to travel longitudinally in order to perform its locking function. (Slide-plate recesses 529 may be needed to avoid some of the fasteners (not shown) when the fasteners are extended through fastener openings 556.)

FIG. 5*d* is an isometric view of front cover 520 with keymat 510 installed. While no specific assembly sequence is required, in this embodiment keymat 510 may be mounted on front cover 520, then secured using slide plate 521 before the mobile-station internal assembly is added and captured by attaching a back cover (not shown). Or, if a means is provided for moving slide plate 521 from outside the mobile station enclosure, keymat 510 may be removed and installed without removing front cover 520. Cut-out 533, for example, formed in the side 534 of front cover 520 (or in both side or some other suitable location) may provide access to the slide plate 521 when front cover 520 is in place.

FIG. 5*e* is a partial sectional view of a key 513 when the mobile station is assembled. Key pin 515, in an assembled configuration, extends interiorly toward key dome 581, a structure disposed above two (or more) internal switch elements 582, and serves to translate to key dome 581 the force applied by a user pressing a key. In this embodiment, the key pin 515 is shown as formed separately from web 511, allowing for it to be composed of a different, perhaps stiffer material. It may be separately formed and attached using an adhesive, or "in-molded" using for example a two-shot molding process. In this embodiment, recess 517 formed in the web 511 of keymat 510 receives key pin 515 during the molding process, or later during manufacture or assembly of the complete mobile station. As shown in FIG. 5*e*, slide plate 521 has already been moved into the locked position such that the inner walls of the smaller opening portion 525 are received into recesses 514, thus holding the installed keymat 510. Note that the recesses 514 are in this embodiment large enough to permit some movement of key pin relative to the slide lock so that it does not resist key activation. In another embodiment (not shown), slide plate 521 is flexible enough to permit actuation regardless of whether the recesses 514 are significantly larger than the slide plate 521 in the direction of actuation. In the illustrated embodiment, note that the interior surface 531 of front cover 520 forms extension tabs 532 for stabilizing slide plate 521 and retaining it in the proper orientation to reliably engage recesses 514 when moved into the "lock" position. In an alternate embodiment (not shown), extension tabs 532, or some of them, may extend through openings formed in slide plate 521 to prevent unwanted lateral movement as well. Similar tabs (not shown) extending from light guide 550 may be desirable as well.

Figure 6A:
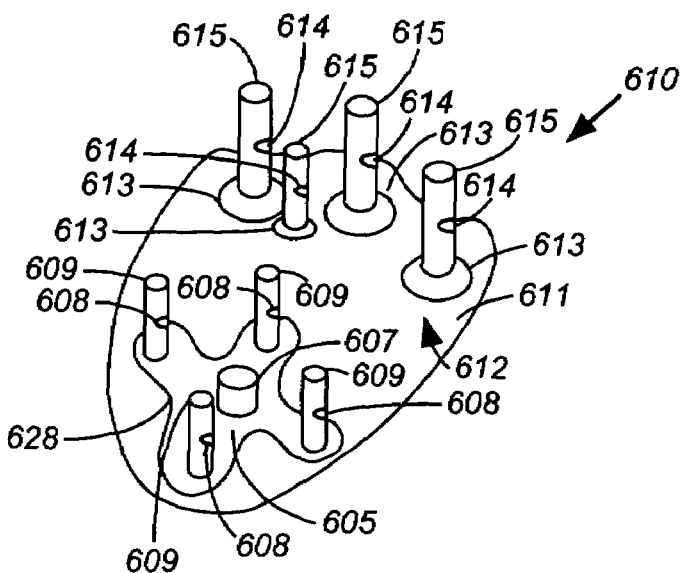
FIGS. 6a-6c illustrate a keymat according to another embodiment of the present invention.
Figure 6B:
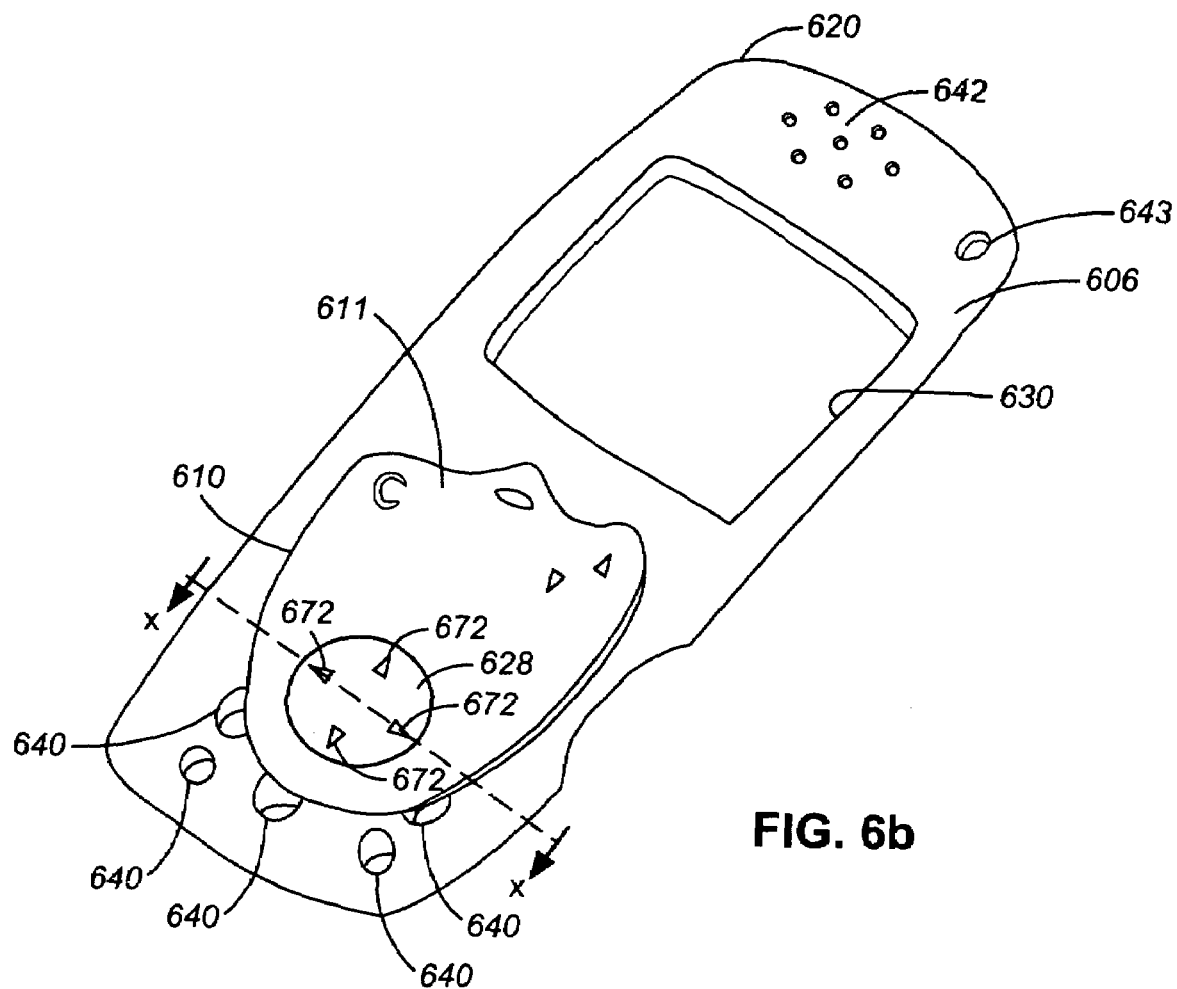
Figure 6C:
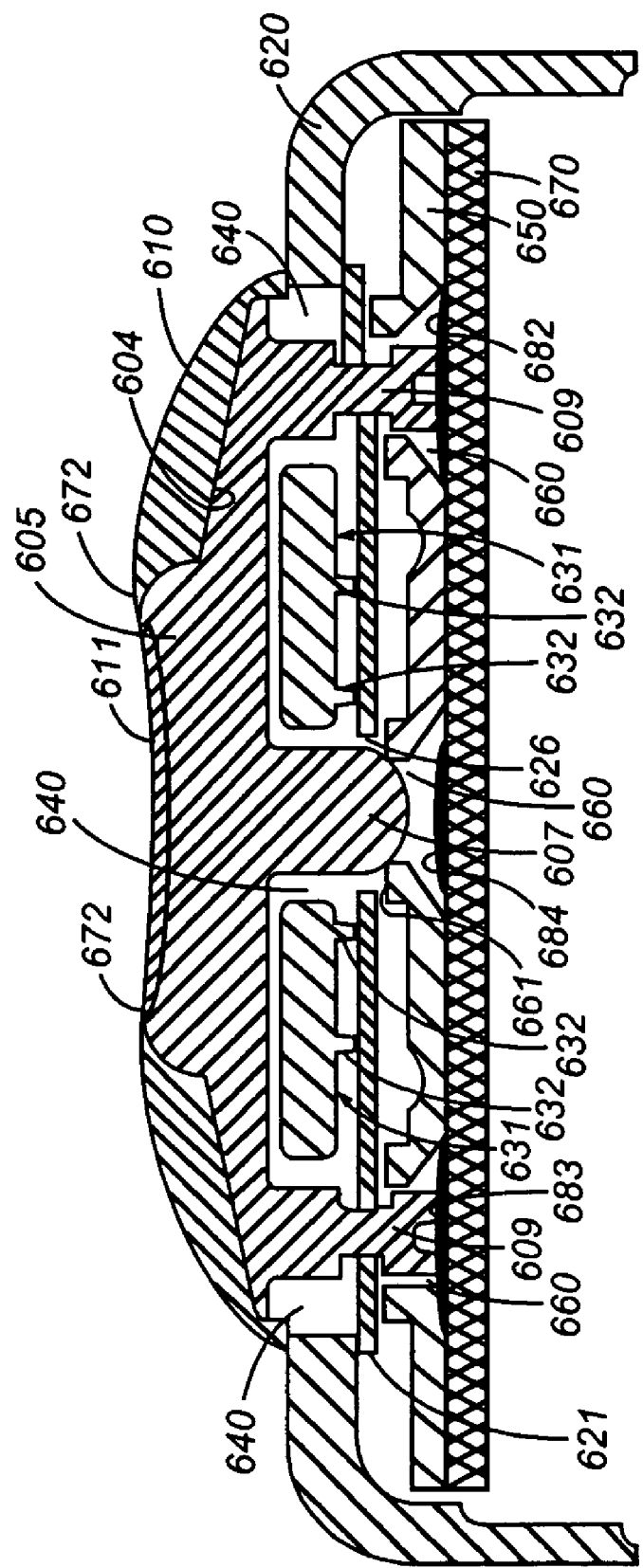

FIGS. 6*a*-6*c* illustrate a keymat 610 according to another embodiment of the present invention. FIG. 6*a* is an isometric view of a specialized keymat 610; FIG. 6*b* is an isometric view of the keymat 610 of FIG. 6*a* assembled onto a mobile-station front cover 620; and FIG. 6*c* is a partial sectional view illustrating the cooperation of the joystick 628 with other mobile-station components. In the embodiment of FIGS. 6*a*-6*c*, external keymat 610 is a specialized keymat, one used for playing games, for example. As mentioned previously, aside from affording a user the opportunity to change the appearance of the mobile station, or simply to replace a worn key pad, the exchangeable keymats of the present invention permit the use of different key pads for different functions. In the case of applications such as games, which are often secondary to the devices main purpose, this may be of particular advantage. Most game players have little use for the alphanumerically-labeled keys of a standard telephone, and must simply remember that the "6" key performs one function while the "8" key performs another. The present invention permits the key pad to be labeled more appropriately for the game being played.

In addition, the key pad itself may be configured differently as well. Many games favor the use of joystick-like devices not even found on mobile stations. A joystick is a multiple position pointing device common in the game-playing environment, and may be so called even where, as in FIGS. 6*b* and 6*c*, the "stick" itself is absent. Such a configuration might be more accurately referred to as a "joy pad", but for this disclosure the distinction is immaterial and will not be made. (The stick may be included in keymat 610 or added at the user's discretion.)

It is noted that the joystick 628 of the illustrated embodiment may not function exactly as a traditional joystick given that in a conventional mobile phone it will operate four switches that are either on or off. As mentioned previously, however, the mobile station itself may be modified to accommodate non-traditional applications. For example, the electrical switches operated by joystick 628 may have an operational mode in which they can detect degrees of movement. Keymat 610 may be modified, of course, to accommodate such as enhancement. Returning to the illustrated embodiment, FIG. 6*a* illustrates the interior side of game keymat 610. As will be apparent from FIG. 6*a*, the keymat 610 has a key configuration different from that used for a telephone. In this embodiment, there are four independently functioning keys 613, each having a key pin 615 with opposing recesses 614 (only one of which is visible on each pin 615 in FIG. 6*a*). Thus configured, the will be secured to the mobile station and operated in much the same fashion as keys 512 shown in FIG. 5*c*.

Returning to FIG. 6*a* keymat 610 also includes four pins 609, each having a pair of opposing recesses 608 similar to recesses 614 in pins 613. Each of the four pins 609, however, is formed with (or attached to) joystick 628 in each of four positions surrounding joystick boss 607. The operation of joystick 628 is explained more fully below with reference to FIG. 6*c*. FIG. 6*b* is an isometric view of front cover 620 having keymat 610 installed in an operational configuration. From this view, joystick 628 is visible near the bottom of keymat 610, appearing as a slightly concave area. The markings visible on joystick 628 are, in this embodiment, openings 672 formed in web 611 through which joystick key element 605 is visible. Joystick 628 is as shown formed by a two-step molding process, and key element 605 is disposed within a recess 604 formed in web 611. (See FIG. 6*c*). This form of construction permits markings on joystick 628 to be illuminated, assuming key element 605 possesses the appropriate light-guiding properties. Note that the keys 613 appearing near the upper end of keymat 610 may be similarly constructed or simply integrally molded with web 611 (see, for example, the embodiment of FIGS. 3*a*-3*c*) as a matter of design preference. Finally, note that in FIG. 6*b* not all of the openings 640 of front cover 620 are covered by keymat 610, meaning that the switches associated with them are not used in this application. While shown in this way for illustration, it would be preferable in practice to cover these unused openings in some manner.

FIG. 6*c* is a cross-sectional view of the front portion of mobile station taken along sectional line X-X in FIG. 6*b*. Sectional line X-X is drawn across joystick 628, which is illustrated because its construction is different from those embodiments previously shown. In this view, two of the pins 609 may be seen extending inwardly from joystick key element 605. (A third pin 609 that would be partially visible near the center of the drawing has been eliminated for clarity.) As mentioned previously, joystick 628 is formed by key element 605 disposed in recess 604 in web 611 of keymat 610. Forming joystick 628 integrally with keymat 610 is also possible, but not a preferred embodiment. In the embodiment of FIG. 6c, key element is partially visible to the user through openings 672 in web 611, thus forming the key markings visible in FIG. 6b.

Similar to the embodiment of FIGS. 5a-5e, slide plate 621 is used to retain game keymat in place. Slide plate 621 is not shown separately, but is similar or identical to slide plate 521 shown in FIGS. 5a and 5b. Although the slide plate 621 performs a similar function to that of slide plate 521, note that in this application recesses 608 in pins 609 should be somewhat enlarged to permit proper operation of joystick 628. That is because when either side of joystick 628 is pressed (or similarly manipulated by an actual stick) the pin on that side is forced down to its respective key dome, here key dome 682 or key dome 683. When this happens, key member 605 rocks upon joystick boss 607 causing the opposing key pin 609 to rise correspondingly. (Note that key dome 684 inward of joystick boss 607 is not used in this application.)

Each pin 609 extends through an opening 640 in front cover 620, as well as an opening 660 in light guide 650. Joystick boss 607 likewise extend through an opening 640, but is too large to past a light guide opening 660. Instead, joystick boss preferably is disposed adjacent to the rim 661 of an opening 660, providing a suitable pivoting location. And while pins 609 also extend through openings in slide plate 621, joystick boss 607 is accommodated by an oversized opening 626 (refer also to FIGS. 5a and 5b).

In the embodiment of FIG. 6c, extending tabs 632 are also present, formed on the interior surface 631 of front cover 620, to stabilize and retain slide plate 621. In an alternate embodiment (not shown), it may be preferable to instead eliminate extending tabs 632 in the vicinity of joystick 628, or to eliminate them entirely. Finally, an actual joystick "stick" (not shown) may easily be added by forming an extension from key element 605 extending outwardly opposite joystick boss 607 through an additional opening formed in web 611 of keymat 610.

In a particularly preferred embodiment, key pins such as key pins shown in FIG. 6b perform a light directing function as well, permitting them to be used for labeling the keys behind which they are disposed. In this embodiment, for example, small openings are formed in keymat in order to receive projections formed on key pins, which in operation will appear as lighted figures on the key pad.

What is claimed is:

1. A switch-operating device for use with a mobile station having a plurality of key openings, the openings formed in an external housing of the mobile station for access to switches within the mobile station, said switch-operating device comprising:

a plurality of keys;

a web interconnecting the plurality of keys; and a key-pin grid, comprising a network of branches interconnecting a plurality of interconnected key pins, wherein the plurality of interconnected key pins are held in a substantially fixed relationship relative to the network of branches;

wherein in use the key-pin grid is disposed within the external housing and the web and the plurality of interconnected keys are disposed outside the external housing, wherein each key pin extends through one of said plurality of key openings for transmitting user-applied force from one of the keys to one of the switches, wherein the web and the plurality of interconnected keys are not directly connected to the external housing with the web and the plurality of interconnected keys being attached to the mobile station solely by, each of the plurality of keys being removably attached to a corresponding one of the key pins and held together with a corresponding one of the key pins by friction force, and wherein at least one key of the plurality of keys forms an opening for receiving a key pin.

2. A mobile station comprising:

a plurality of internal switches for affecting the operation of the mobile station;

an exterior housing for enclosing the plurality of internal switches, the exterior housing forming a plurality of openings providing access to the internal switches; and a keymat disposed outside the exterior housing with no direct connection thereto, the keymat comprising a plurality of interconnected keys; and a key-pin grid disposed inside the exterior housing and comprising a network of branches interconnecting a plurality of interconnected key pins, wherein the plurality of interconnected key pins are held in a substantially fixed relationship relative to the network of branches with each key pin held together with a corresponding key by friction force, each key pin extending through one of said plurality of openings for transmitting user-applied force from one of the keys to one of the internal switches;

wherein the interconnected keys of the keymat are connected to corresponding key pins of the key-pin grid such that the keymat is attached to the mobile station solely by the keys being attached to the key pins.

3. The mobile station of claim 2, further comprising a light guide disposed interiorly to the exterior housing, the light guide forming at least one opening for receiving a key pin of said plurality of key pins therethrough.

4. A mobile station comprising:

a plurality of internal switches for affecting the operation of the mobile station;

an exterior housing for enclosing the plurality of internal switches, the exterior housing forming a plurality of openings providing access to the internal switches;

a keymat disposed outside the exterior housing with no direct connection thereto, the keymat comprising a plurality of interconnected keys; and a plurality of key pins, each key pin extending through one of the plurality of openings in order to transmit user-applied force from one of the keys to one of the internal switches, and each key pin retained in the one of the plurality of openings by a key pin retaining system;

wherein in use each key pin is connected to a corresponding key on the keymat, and wherein, when the key pins are retained in the plurality of openings by the key pin retaining system, the keymat remains attached to the mobile station solely by the keys being connected to the key pins.

5. The mobile station of claim 4, wherein the keymat comprises a plurality of keymat openings, each keymat opening configured to receive at least a portion of a corresponding key pin;

wherein the keymat openings are configured to hold the key pins by friction force during normal operation of the mobile terminal while still allowing the user to force the keymat into and out of cooperation with the key pins; and wherein the key pin and the corresponding key are connected by the portion of the key pin being retained by the keymat opening.

6. The mobile station of claim 5, wherein the portion of the key pin retained by the keymat opening is retained by friction force.

7. The mobile station of claim 4, wherein the key pin retaining system comprises:
   a slide plate disposed inside the exterior housing and configured to slide within the mobile station from a first position to a second position, wherein when the slide plate is in the first position the keymat and the key pins can be removed from the mobile station, and wherein when the slide plate is in the second position the slide plate engages at least one key pin so that the key pin is secured to the mobile station.

8. The mobile station of claim 7, wherein at least one key pin comprises a recess;
   wherein the slide plate comprises at least one key opening corresponding to at least one key; and
   wherein the at least one key opening comprises:
      a larger portion configured to receive at least a portion of one of the key pins when the slide plate is in the first position; and
      a smaller portion configured to engage the key pin at the recess when the slide plate is moved into the second position.

9. The mobile station of claim 8, wherein the slide plate comprises a key opening for each of the plurality of internal switches.

10. The mobile station of claim 7, wherein the key pins are integrally formed with the keymat.

11. The mobile station of claim 10, wherein the keymat remains attached to the mobile station solely by the slide plate when the slide plate is in the second position and is engaging at least one key pin.

12. The mobile station of claim 4, further comprising a second keymat configured to be exchangeable with the first keymat, wherein the configuration of the keys of one keymat is different from the configuration of the keys of the other keymat.

13. The mobile station of claim 12, wherein one of the two exchangeable keymats comprises a joystick-type key.

14. The mobile station of claim 4, wherein the key pin is connected to the corresponding key by the key pin being integrally formed with the corresponding key.

15. The mobile station of claim 4, wherein the key pin retaining system is configured to retain the key pins so that the key pins are removable by a user.

16. The mobile station of claim 15, wherein the key pin retaining system comprises:
   a circumferential lip integrally formed with each of the plurality of key pins;
   wherein when the key pins are retained in the plurality of openings, the circumferential lip is disposed within the external housing; and
   wherein each key is integrally formed with the corresponding key pin.

17. The mobile station of claim 4, wherein the key pin retaining system comprises:
   a key-pin grid interconnecting a plurality of key pins;
   wherein in use the key grid is disposed within the external housing.

18. The mobile stations of claim 17, wherein the key-pin grid is integrally formed with the plurality of key pins.

* * * * *